US011706068B2

United States Patent
Yi et al.

(10) Patent No.: US 11,706,068 B2
(45) Date of Patent: *Jul. 18, 2023

(54) METHOD AND APPARATUS FOR PERFORMING INITIAL ACCESS PROCEDURE FOR LOW COST USER EQUIPMENT IN WIRELESS COMMUNICATION SYSTEM

(71) Applicant: LG Electronics Inc., Seoul (KR)

(72) Inventors: Yunjung Yi, Seoul (KR); Joonkui Ahn, Seoul (KR); Hyangsun You, Seoul (KR)

(73) Assignee: LG Electronics Inc., Seoul (KR)

( * ) Notice: Subject to any disclaimer, the term of this patent is extended or adjusted under 35 U.S.C. 154(b) by 363 days.

This patent is subject to a terminal disclaimer.

(21) Appl. No.: 16/937,205

(22) Filed: Jul. 23, 2020

(65) Prior Publication Data

US 2020/0359421 A1 Nov. 12, 2020

Related U.S. Application Data

(63) Continuation of application No. 15/513,354, filed as application No. PCT/KR2015/010034 on Sep. 23, 2015, now Pat. No. 10,805,957.

(Continued)

(51) Int. Cl.
*H04W 4/00* (2018.01)
*H04L 27/26* (2006.01)
(Continued)

(52) U.S. Cl.
CPC ...... *H04L 27/2602* (2013.01); *H04J 11/0026* (2013.01); *H04L 5/0007* (2013.01);
(Continued)

(58) Field of Classification Search
CPC ... H04W 74/0833; H04W 4/70; H04W 48/02; H04W 72/042; H04W 72/0446;
(Continued)

(56) References Cited

U.S. PATENT DOCUMENTS

| 10,805,957 B2* | 10/2020 | Yi | ................. H04W 74/002 |
| 2012/0195291 A1 | 8/2012 | Kuo | ................. H04W 4/06 |
| | | | 370/336 |

(Continued)

FOREIGN PATENT DOCUMENTS

WO    WO-2015116732 A1    8/2015    .............. H04W 4/70

OTHER PUBLICATIONS

U.S. Appl. No. 61/955,655; Lee, "Method of Access and Link Adaptation for Low Cost MTC Devices in Coverage Enhanced Mode": filed Mar. 19, 2014 (Year: 2014).

*Primary Examiner* — Siren Wei
(74) *Attorney, Agent, or Firm* — Dentons US LLP

(57) ABSTRACT

A method and apparatus for performing an initial access procedure in a wireless communication system is provided. A low cost user equipment (UE) transmits a list of capabilities to a network, and receives a reject message from the network when at least one of the capabilities is not supported by the network. The list of capabilities may be transmitted during a random access procedure via a random access preamble on a physical random access channel (PRACH) or a message 3 on a physical uplink shared channel (PUSCH). The reject message may be received during the random access procedure a random access response or an acknowledge message for the message 3.

12 Claims, 15 Drawing Sheets

Related U.S. Application Data

(60) Provisional application No. 62/161,214, filed on May 13, 2015, provisional application No. 62/153,495, filed on Apr. 27, 2015, provisional application No. 62/076,465, filed on Nov. 6, 2014, provisional application No. 62/058,707, filed on Oct. 2, 2014, provisional application No. 62/054,377, filed on Sep. 23, 2014.

(51) Int. Cl.

| | | |
|---|---|---|
| *H04W 48/02* | (2009.01) | |
| *H04W 74/00* | (2009.01) | |
| *H04L 5/00* | (2006.01) | |
| *H04W 72/23* | (2023.01) | |
| *H04J 11/00* | (2006.01) | |
| *H04W 4/70* | (2018.01) | |
| *H04L 5/22* | (2006.01) | |
| *H04W 72/0446* | (2023.01) | |
| *H04W 74/08* | (2009.01) | |

(52) U.S. Cl.
CPC .......... *H04L 5/0053* (2013.01); *H04L 5/0058* (2013.01); *H04L 5/22* (2013.01); *H04W 4/70* (2018.02); *H04W 48/02* (2013.01); *H04W 72/0446* (2013.01); *H04W 72/23* (2023.01); *H04W 74/002* (2013.01); *H04W 74/006* (2013.01); *H04W 74/0833* (2013.01); *H04L 27/2603* (2021.01)

(58) Field of Classification Search
CPC ............... H04W 74/002; H04W 74/006; H04J 11/0026; H04L 5/0007; H04L 5/0053; H04L 27/2602; H04L 5/0058; H04L 5/22; H04L 27/2603
See application file for complete search history.

(56) References Cited

U.S. PATENT DOCUMENTS

| | | | |
|---|---|---|---|
| 2012/0282956 A1 | 11/2012 | Kim et al. | |
| 2013/0044594 A1 | 2/2013 | Kim et al. | |
| 2013/0100895 A1 | 4/2013 | Aghili et al. | |
| 2013/0128777 A1 | 5/2013 | Garcia Azorero | |
| 2013/0155974 A1 | 6/2013 | Papasakellariou et al. | |
| 2013/0230016 A1 | 9/2013 | Lindoff | H04W 74/006 370/330 |
| 2013/0237267 A1 | 9/2013 | Lee et al. | |
| 2013/0242931 A1 | 9/2013 | Bi et al. | |
| 2013/0250875 A1 | 9/2013 | Chen et al. | |
| 2013/0308572 A1 | 11/2013 | Sayana et al. | |
| 2013/0322363 A1 | 12/2013 | Chen et al. | |
| 2014/0016615 A1 | 1/2014 | Nanri et al. | |
| 2014/0071930 A1 | 3/2014 | Lee et al. | |
| 2014/0098761 A1* | 4/2014 | Lee | H04L 1/1819 370/329 |
| 2014/0105158 A1 | 4/2014 | Kim et al. | |
| 2014/0161084 A1 | 6/2014 | Yang et al. | |
| 2015/0016312 A1 | 1/2015 | Li | H04W 74/0833 370/280 |
| 2015/0043445 A1 | 2/2015 | Xiong | H04W 76/14 370/329 |
| 2015/0085717 A1 | 3/2015 | Papasakellariou | H04L 5/14 370/280 |
| 2015/0365968 A1 | 12/2015 | Kim | H04B 7/2656 370/280 |
| 2016/0150570 A1 | 5/2016 | Wang | H04W 74/0833 370/329 |
| 2016/0192376 A1 | 6/2016 | Lee | H04W 48/20 370/252 |
| 2016/0234787 A1 | 8/2016 | Liu | H04W 52/367 |
| 2016/0255591 A1 | 9/2016 | Park | H04W 52/242 455/522 |
| 2016/0330698 A1 | 11/2016 | Loehr | H04W 72/04 |
| 2016/0337961 A1 | 11/2016 | Hu | H04W 48/20 |
| 2016/0337988 A1 | 11/2016 | Nan | H04W 52/50 |
| 2016/0337991 A1 | 11/2016 | Zhang | H04W 4/70 |
| 2016/0353440 A1 | 12/2016 | Lee | H04W 72/0453 |
| 2017/0013643 A1 | 1/2017 | Nan | H04W 74/006 |
| 2017/0041960 A1 | 2/2017 | Quan | H04W 4/70 |
| 2017/0181009 A1 | 6/2017 | Wong | H04L 1/0033 |
| 2017/0238302 A1 | 8/2017 | Futaki | H04W 72/048 370/329 |
| 2017/0238345 A1 | 8/2017 | Liu | H04W 74/08 370/329 |
| 2017/0280481 A1* | 9/2017 | Stern-Berkowitz | H04L 5/0092 |
| 2017/0280483 A1 | 9/2017 | Liu | H04W 36/385 |
| 2018/0220373 A1 | 8/2018 | Arzelier | H04W 4/027 |

* cited by examiner

FIG. 5
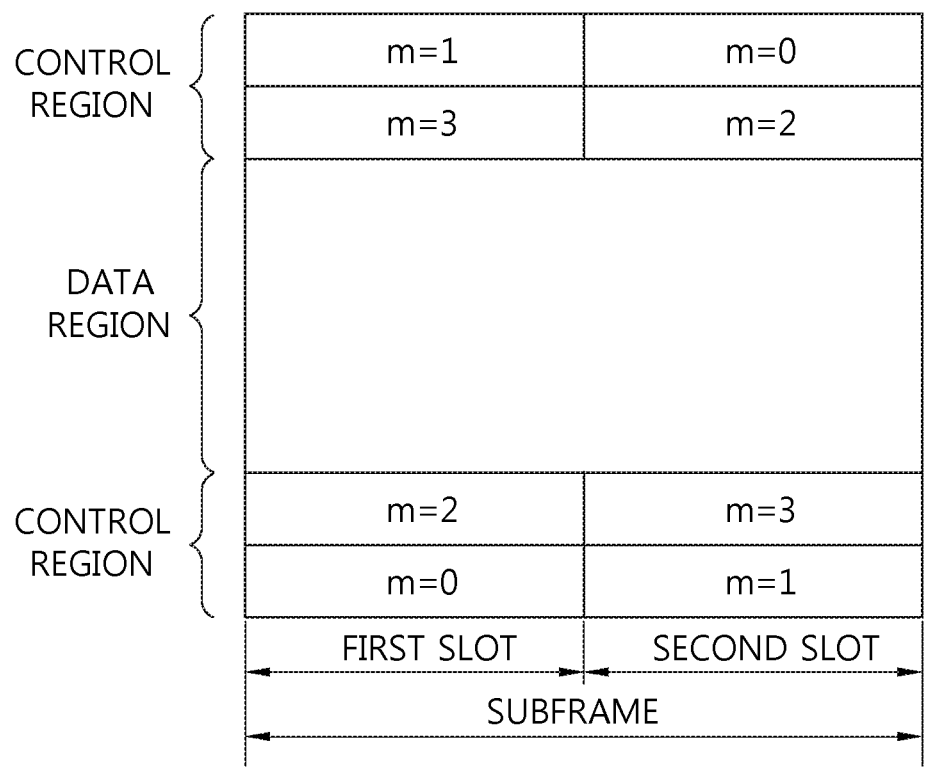
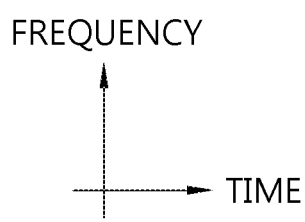

FIG. 9

| | | |
|---|---|---|
| R | Timing Advance Command | Oct 1 |
| Timing Advance Command | UL Grant | Oct 2 |
| UL Grant | | Oct 3 |
| UL Grant | | Oct 4 |
| Temporary C-RNTI | | Oct 5 |
| Temporary C-RNTI | | Oct 6 |

METHOD AND APPARATUS FOR PERFORMING INITIAL ACCESS PROCEDURE FOR LOW COST USER EQUIPMENT IN WIRELESS COMMUNICATION SYSTEM

CROSS-REFERENCE TO RELATED APPLICATIONS

This application is a Continuation of U.S. patent application Ser. No. 15/513,354, filed on Mar. 22, 2017, which is a National Stage filing under 35 U.S.C. 371 of International Application No. PCT/KR2015/010034, filed on Sep. 23, 2015, which claims the benefit of U.S. Provisional Applications No. 62/054,377 filed on Sep. 23, 2014, No. 62/058,707 filed on Oct. 2, 2014, No. 62/076,465 filed on Nov. 6, 2014, No. 62/153,495 filed on Apr. 27, 2015, and No. 62/161,214 filed on May 13, 2015, the contents of which are all hereby incorporated by reference herein in their entirety.

BACKGROUND OF THE INVENTION

Field of the Invention

The present invention relates to wireless communications, and more particularly, to a method and apparatus for performing an initial access procedure to handle a low cost user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

When a MTC UEs are introduced, a new feature for an initial access process may be required.

SUMMARY OF THE INVENTION

The present invention provides a method and apparatus for performing an initial access procedure to handle a low cost user equipment (UE) in a wireless communication system. The present invention discusses how to create/handle a UE with limited radio frequency (RF) capability to receive downlink data successfully serviced by a wideband system bandwidth network. The present invention particularly focuses on the initial access procedure.

In an aspect, a method for performing, by a low cost user equipment (UE), an initial access procedure in a wireless communication system is provided. The method includes transmitting a list of capabilities to a network, and receiving a reject message from the network when at least one of the capabilities is not supported by the network.

In another aspect, a low cost user equipment (UE) includes a memory, a transceiver, and a processor coupled to the memory and the transceiver, and configured to control the transceiver to transmit a list of capabilities to a network, and control the transceiver receive a reject message from the network when at least one of the capabilities is not supported by the network.

Initial access procedure for a low cost UE can be performed efficiently.

BRIEF DESCRIPTION OF THE DRAWINGS

FIG. 5 shows structure of an uplink subframe.
FIG. 9 shows an example of a current RAR.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
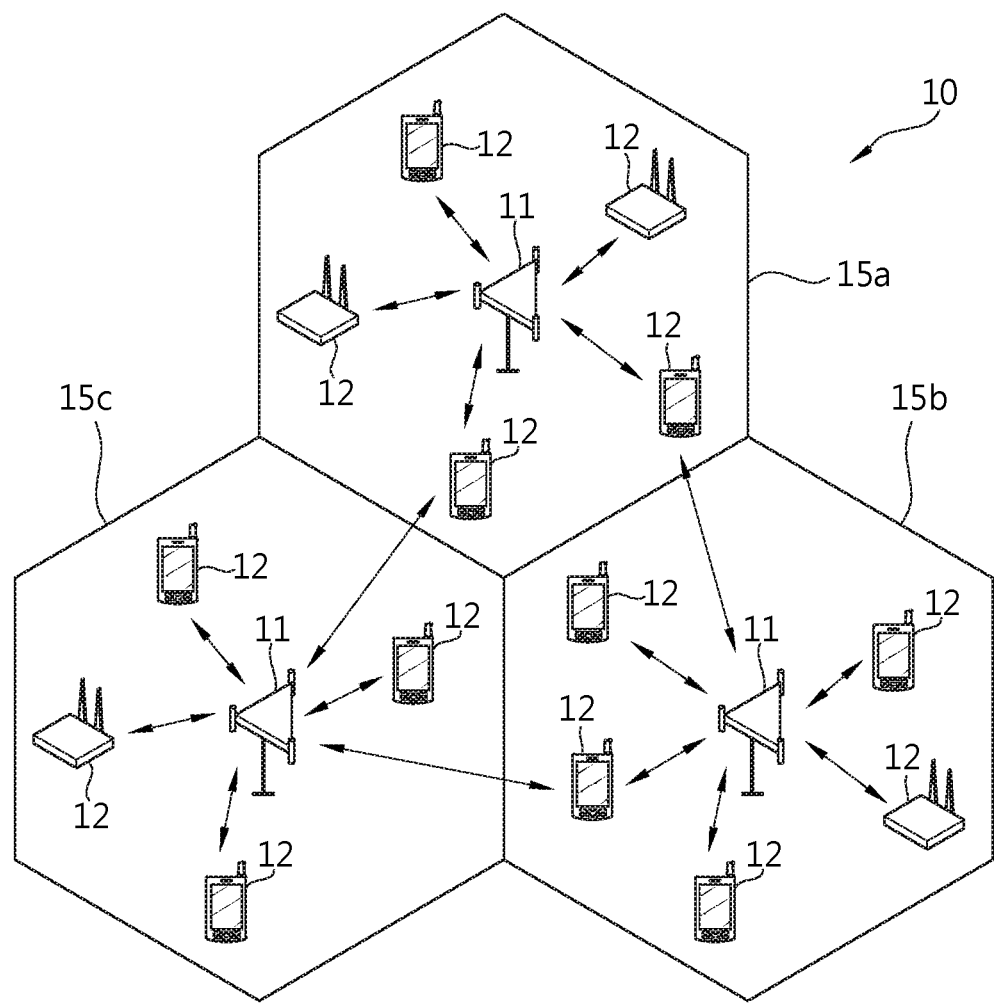
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
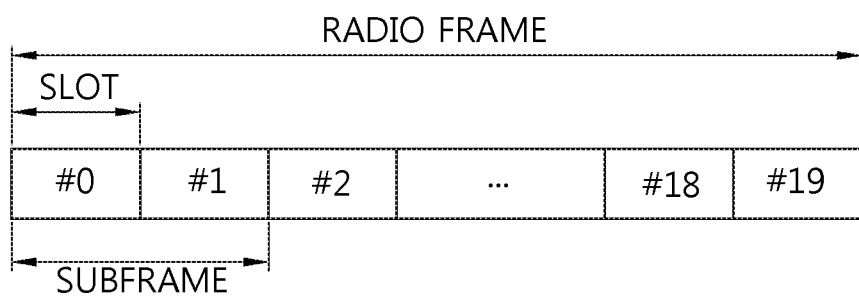
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
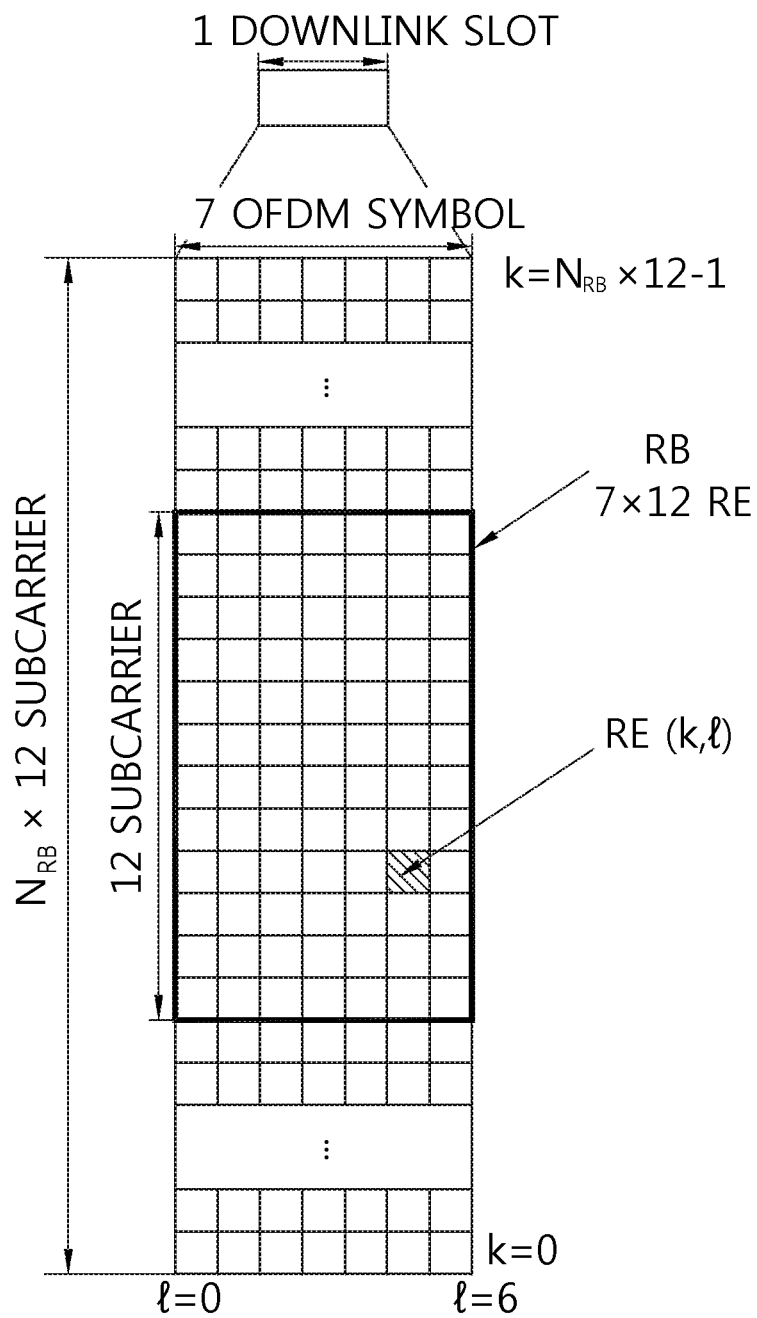
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
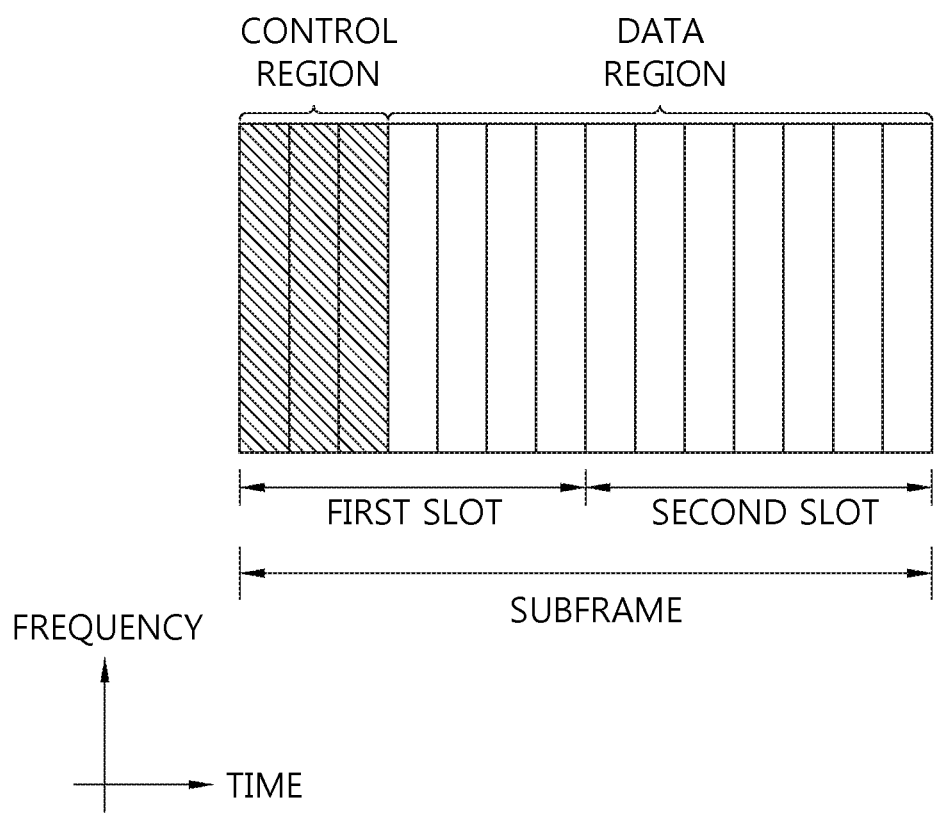
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification.

Hereinafter, a method for performing an initial access procedure to handle a MTC UE according to an embodiment of the present invention is described. Hereinafter, all of a MTC UE, a low cost UE, a low end UE, a low complexity UE, a narrow(er) band UE, a small(er) band UE, or a new category UE may be used mixed with each other. Or, just UE may refer one of UEs described above. In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality.

The followings may be assumed:

(1) Operating bandwidth of a UE may be known to the eNB. To inform operating bandwidth, multiple approaches may be proposed. It may be assumed that that before scheduling any PDSCH/PUSCH, the eNB knows the operating bandwidth of a UE. In the description below, operating bandwidth in terms of the number of PRBs of a narrow-band UE is given as $N_{RB}^{DL\_Op}$. It may be assumed that operating bandwidth is consistent for all narrow-band UEs within a cell. Also, UL transmission bandwidth of a narrow-band UE may be the same as the DL operating bandwidth, i.e. $N_{RB}^{DL\_Op}$. In other words, UL (RF and) baseband can process only narrow-band as well.

(2) Operating bandwidth of a UE may be equal to or larger than 1.4 MHz (or 6RB), and thus, the UE is able to receive physical broadcast channel (PBCH)/primary synchronization signal (PSS)/secondary synchronization signal (SSS) transmitted over center 6RB of system frequency band. Otherwise, a new signal similar to PBCH/PSS/SSS may be transmitted to narrower bandwidth. Even with supporting 1.4 MHz, it may be expected that a new signal for PBCH/PSS/SSS are considered to support a low cost UE. In this case, the new signal may be called MTC-PBCH, MTC-PSS and MTC-SSS.

(3) The present invention may be applied two scenarios: (1) RF is capable of receiving system bandwidth (e.g., 20 MHz) but baseband is capable of processing only narrow-band, (2) both RF and baseband can handle narrow bandwidth. If the first scenario is used, frequency retuning delay is not considered. If the second scenario is used, tuning delay to change frequency should be considered.

(4) This invention may assume that via RRC signaling (or other means) the UE is notified the number of symbols used for legacy PDCCH (sent over system bandwidth) after serving cell is established. At initial stage, upon receiving PBCH (i.e. discovering system bandwidth), the narrow-band UE may configure the default value for the number of symbols for legacy PDCCH to the maximum symbol counts based on system bandwidth (e.g. three for NRBDL=100).

(5) The narrow-band UE may support only one LTE band and single radio access technology (RAT). However, it is not precluded to consider inter-RAT handover case for a low cost UE. Just for the simplicity, this invention may assume single-RAT supporting UE.

(6) As the narrow-band UE cannot decode legacy PDCCH, another control channel mechanism (such as enhanced PDCCH transmitted/multiplexed in PDSCH area) may be assumed for supporting narrow-band UEs.

It is assumed that the network may support larger than 1.4 MHz system bandwidth whereas a MTC UE may support only 1.4 MHz system bandwidth. Here, the system bandwidth from a UE perspective may be referred as RF bandwidth that a UE can support. The initial access procedure according to an embodiment of the present invention may need to be clarified as follows.

(1) How does the UE know that the network supports a MTC UE: Considering a MTC UE may have different capabilities, it is also required to know which capabilities are supported by the network. For example, whether the network supports half-duplex FDD UEs or not may need to be informed. Earlier indication of network support on a certain feature may be desirable to minimize the UE power consumption and the latency of cell association. One approach is to mandate a network to support all possible low cost capabilities once it supports a low cost feature. For example, the network may support half duplex (HD)-FDD, UL power reduction, reduced peak rate, etc. Another approach, to allow network flexibility, is to allow the network signal a set of capabilities that the network supports so that a UE can make early decision to continue cell association process or not.

Another approach is to allow a UE to transmit a list of capabilities along with physical random access channel (PRACH) and/or PUSCH message 3, such that a network may transmit a reject message at radon access response (RAR) and/or ACK for message 3, if any of capability is not supported by the network. Additionally, the network may indicate a set of capabilities/supportability of certain features via master information block (MIB) and/or SIB. It may be represented as a bitmap where each bit indicates whether a certain capability is supported or not. For example, coverage enhancement (CE) levels may be represented as a few capabilities such as CE level 5 dB, CE level 10 dB, CE level 15 dB as a separate capability, respectively.

(2) How does the network know that there may be MTC UEs before transmitting MTC-SIB (or MTC-PBCH or MTC-synchronization signal (SS)): Since additional system information to support MTC UEs may not be desirable if there is no MTC UE around, some indication of presence of MTC UE may be desirable. To support this, a MTC UE may be able to transmit a request if it knows that the network supports a MTC UE (by maintaining history of cell association or by other external means) without receiving any broadcast data for a while. This may be based on PRACH with a pre-allocated dedicated preamble. If such a mechanism or other means are not used, the network may transmit MTC-SIB with less frequency than SIBs for legacy UEs. The transmission frequency of MTC-SIB may be predetermined based on system frame number (SFN) information which is assumed that a MTC UE can read by reading legacy PBCH as long as it knows the center frequency.

Another approach is to adapt the frequency of SIB transmission by indicating the frequency (or SI window) via MIB. If there are many MTC UEs, more frequent SIB transmission may be used to minimize the latency. If there are not many MTC UEs expected, less frequent SIB transmission may be considered. The change of SI window or the frequency of SIB transmission may be indicated by SI update notification similar to current mechanism to indicate SIB update (e.g. via paging) or by a new mechanism. Or, to avoid potential confusion, the frequency of SIB may change in a predictable way, e g minimum SI window, 2*minimum SI window, 4*minimum SI window, etc. Based on knowledge that a UE may acquire based on MIB, a UE may expect SIB in a certain set of subframes.

(3) How does the network know a UE transmitted PRACH is a MTC UE: Since a MTC UE cannot read PDCCH transmitted over the entire system bandwidth, the network needs to know the capability of the UE before transmitting RAR. For this, time division multiplexing (TDM) or frequency division multiplexing (FDM) of PRACH may be considered such that the network can identify whether the UE is a MTC UE or not. One example is to configure a separate set of PRACH resource for MTC UEs.

(4) How does the UE know that the network is available for camp-on: Similar to current mechanism, SIB may be used for access barring. Another approach to handle potential congestion or too many users at one time, further consideration to transmit a reject message via RAR and/or ACK-NACK for message 3 may be considered. Some fields in RAR may be set with a predetermined set of values to indicate "REJECT". One example is to set MCS as "−1". For ACK-NACK, some resource may be reserved to show "REJECT?. In terms of PHICH resource or enhanced PHICH (EPHICH) resource, two resource may be reserved where one resource is used for ACK-NACK if the network can accept the UE and the other resource is used for ACK-NACK if the network cannot accept the UE. Similarly, SIB may carry the information of cell access barring if the congestion occurs.

(5) How to compensate UL coverage if low power is used: First of all, assuming that the transmission power reduction is a UE capability, the network may not know whether there will be any UE requiring UL CE or not. From a UE perspective, it may also not know whether UL CE is needed or not before it measures reference signal received power (RSRP). Thus, when a UE detects a cell based on PSS/SSS, and or cell-specific RS (CRS) and/or PBCH, a UE may measure RSRP. Based on the difference between normal UE maximum power and its reduced power (e.g. 15 dB reduction), based on DL signal reception, the UE may estimate the needed UL CE. If the UE determines that the UL CE is needed, it may search SIB information which indicates resource pool (e.g. PRACH resource pool) which may be used for CE (maybe separate resource pool for CE on both DL and UL and CE on UL, respectively). The identified resource may be used to transmit repeated PRACH transmission. If there is no resource identified, the UE may assume that the network may not support reduced UL power. Thus, it may search a different cell. Alternatively, the network may assume that all MTC UEs may need some UL CE depending on their location. Thus, the PRACH configuration may indicate PRACH resource which may be used for PRACH repletion as well. The number of repetitions may be determined based on the CE level required which depends on RSRP and reduced UL power.

Figure 6:
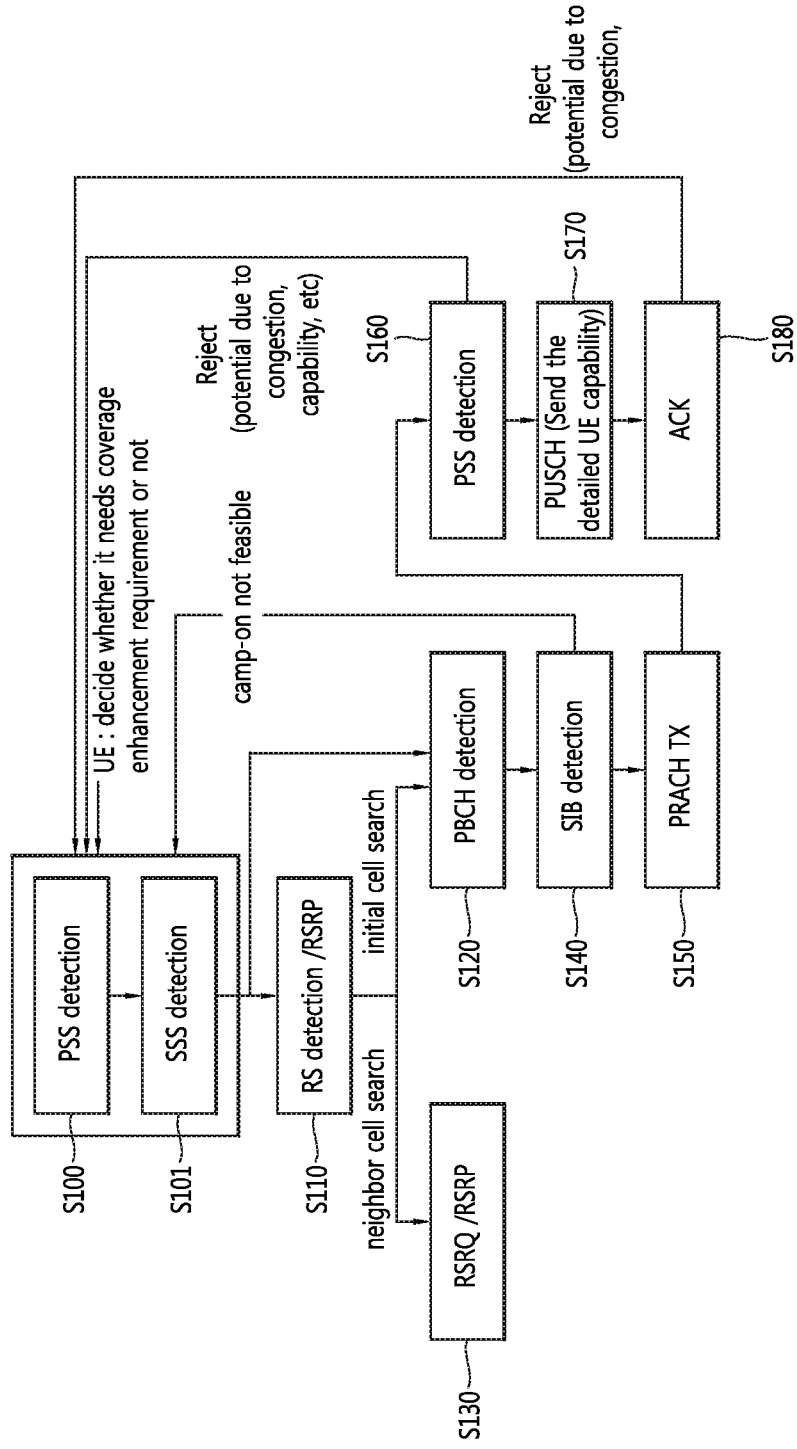
FIG. 6 shows an overall procedure of initial access according to an embodiment of the present invention.

FIG. 6 shows an overall procedure of initial access according to an embodiment of the present invention. In terms of transmission of signals, each step according to an embodiment of the present is as follows.

(1) PSS/SSS detection (S100): Regarding PSS detection (S101), unless multiple subband may be configured for supporting many MTC UEs in a wide-band system bandwidth or the network may utilize a set of 1.4 MHz carriers, it is assumed that a MTC UE is able to read PSS shared with legacy UE regardless of system bandwidth. Regarding SSS detection (S102), similar to PSS, the same SSS may be shared. If subband for a MTC UE (e.g. dedicated subband) is used, another SSS which indicates the index of the dedicated subband may be transmitted. Since the UE needs to know the system bandwidth to apply a subband, the information of dedicated subband may be transmitted over SIB or PBCH instead of via SS (2) RS detection/RSRP (S110): Based on RSRP, a UE may estimate the CE level (e.g. for DL and UL, or for UL only) based on its capability of maximum power and the geometry, etc. If a new RS pattern or some power boosting on RS is used for a MTC UE (such as the increased density of CRS over 6 PRBs region), RSRP may be measured over those RS REs only. One example is to prefix a set of subframes which may be used for a MTC UE (regardless of multicast-broadcast single-frequency network (MBSFN) configuration, or TDD DL/UL configuration). One example is to set subframe #1 for DL in every radio frame used for a MTC UE in FDD and subframe subframe #1 or #5 in TDD. To use special subframe #1 effectively, a MTC UE may assume that the length of DwPTS is 11 (or 12) OFDM symbols in normal CP or 9 (or 10) OFDM symbols in extended CP. This means that a MTC UE may not be able to utilize UL pilot time slot (UpPTS) due to the lack of switching, guard period. Thus, a MTC UE may not be scheduled to transmit any UL in UpPTS (or not scheduled with PRACH in that UpPTS). In other words, regardless of DL pilot time slot (DwPTS) configuration, a MTC UE may assume the shorted guard period and the network may transmit DL data in the long DwPTS region.

Also, for the simplicity, a common design between HD-FDD and TDD may be also considered. If that is considered, special subframe will be used for guard period to switch from DL to UL. Also, from UL to DL, one DL subframe may be allowed as not usable (same as HD-FDD). If this common design is used, HD-FDD may also operate by configuring any TDD DL/UL configuration. DL may be used by guard period only. So, for example, TDD DL/UL configuration 0 may not be supported. Also, TDD DL/UL configuration 1 seems not efficient to be supported. For example, for configuration 2 (DSUDDDSUDD), it may be interpreted as DXUXDDXUXD. All HARQ-timing and ACK-NACK multiplexing may follow TDD configuration 2. The similar procedure may be applied to other TDD DL/UL configurations.

(3) PBCH detection for initial cell search (S120): Unless the network assures that a MTC UE is associated with only center 6 PRBs and the resource allocation (RB assignment) is same as 1.4 MHz system bandwidth regardless of actual system bandwidth, the MTC UE may not need to know the system bandwidth. Otherwise, it may need to acquire system information of the carrier. Also, SFN information is needed. Thus, it is assumed that a MTC UE reads legacy PBCH. Legacy PBCH may carry additional information or separate MTC-PBCH or MTC-SIB may be transmitted to transmit any MTC related information such as the subband location, PRACH configurations.

(4) RSRQ/RSRP for neighbor cell search (S130): Before determining which cell is the best, the UE needs to know which cell supports a MTC UE or not. To determine the network capability, additional SS may be used to just indicate whether it supports a MTC UE or not. However, if the additional signal is not considered, a UE may have to read up to SIB1 before making the cell selection. It is however, a burden on the MTC UE. Thus, it is considerable to transmit a set of cell IDs support a MTC UE in prior. A UE may perform RSRQ/RSRP measurement on neighbor cells only on those preconfigured (or known by experience) cells that support low cost capabilities.

(5) SIB detection (S140): Due to its narrow band nature, it is not straightforward to share SIB between legacy and MTC UEs. Furthermore, the content may be different. Considering TDM or FDM multiplexing of PRACH, it is also desirable to transmit a separate PRACH configuration for MTC UEs. Thus, in general, a MTC UE may search a dedicated MTC-SIB. MTC-SIB may be transmitted in a predetermined subframe (for example, every 1st subframe of every 10 radio frames for SIB-1). The essential information carried over SIB may include the location of MTC-dedicated subband (if it may be different from the center 6 PRBs), and PRACH configuration.

Once the UE reads PBCH and thus knows the system bandwidth, SIB transmission location may be changed based on pre-determined hopping pattern. Since a UE needs to access narrow-band control channel as well, if control channel and data are scheduled in the same subframe, it means that control channel frequency also changes based on predetermined pattern. Alternatively, SIB may be transmitted without PDCCH. In that case, PDSCH for SIB alone (or a new channel similar to PBCH to carry SIB) may perform frequency hopping based on the predetermined pattern. For example, a cell-specific pattern may be determined based on subframe index or radio frame index and cell ID and random number generation. More specifically, if a set of subband usable for MTC UEs are predetermined, the hopping pattern may determine a subband index out of potential K subbands.

Since SIB may have multiple transmissions such as SIB-1 and SIB-2, etc., assigning separate cell-specific hopping pattern may be a bit troublesome if there are multiple cell broadcast data. For example, RAR may also perform hopping. Thus, for a cell broadcast data, subframe-index or radio-frame-index based cell-common hopping may be considered. Regardless of which SIB or cell broadcast data is transmitted, in a subframe or radio frame, frequency based on hopping pattern may be selected and used for data transmission. If control signal and data is transmitted in the same subframe, control signal may also hop based on the hopping pattern. Considering frequency retuning delay to handle the different subband between cell-broadcast and unicast PDSCH/control region, a predetermine frequency switching latency such as 200 us may be fixed and a UE may use the first few symbols to handle the frequency switching (e.g. legacy PDCCH region). If more gap is need, the last symbol from the previous DL subframe may be used in addition to not listening on legacy PDCCH region (mostly for CRS reading).

(6) PRACH transmission (S150): Similar to cell-broadcast data, a cell-common PRACH hopping pattern may also be considered which may be determined based on subframe or radio frame index. The hopping pattern itself may not address multiplexing issue among PRACHs of MTC UEs if a large number of MTC UEs is accessing the cell. For that, similar to TDD PRACH configuration, FDM pattern may also be considered. In this case, PRACH resource may be determined based on the system bandwidth rather than 1.4 MHz. Similar to legacy PRACH configuration, an offset to transmit PRACH may be configured via SIB. By utilizing separate (e.g. TDM or FDM) between MTC and legacy UEs, the network may determine the capability of the sender of PRACH. When considering TDM, different propagation delay may be considered. If a maximum propagation delay of the system is large, the gap between two PRACH source in terms of subframe used for a MTC UE and a legacy UE may have a sufficient gap (such that the overlap between two PRACH transmissions may not occur). One example of such a gap may be 1 TTI.

Also, the scheduling with PUSCH may need to be considered as well. In other words, when PUSCH hopping is used, the PRACH subband for a MTC UE may also hop to be aligned with PUSCH hopping pattern (and thus minimize the collision with legacy UEs UL transmission). Thus, configuration of PRACH hopping in terms of frequency may be further considered where the pattern may be determined based on PUSCH hopping pattern. In that case, PRACH hopping pattern may be determined per UL subband following PUSCH hopping pattern. Or, a new hopping pattern may be further considered. To minimize the cell search efforts of a MTC UE, a network may signal a list of frequencies/cells which support a MTC UE (or preconfigured).

(7) RAR (S160): Considering coexistence between a UE which requires UL CE and UEs not requiring CE, the timing of RAR may become a bit challenging. One way to mitigate this issue is to separately configure a PRACH resource pool for the number of repetitions or the CE level. However, this requires multiple configurations of PRACH, which requires heavy configuration. Thus, a new design of PRACH may also be considered where PRACH bandwidth is reduced to the lower number of PRBs (such as 1 PRB) to allow more power concentrated on the PRB (i.e. power boosting). Another approach is to allow potential UL relay via another MTC UE or a legacy UE to address initial UL shortage. Another alternative approach is to use the worst repetition level if a MTC UE requires any UL CE. Based on the assumption that the network and UE may know the number of subframes used for a PRACH transmission, RAR timing may be determined based on the end of PRACH repetition. Similar to current timing, a UE may wait to receive RAR at n+6th (assuming that n is the last PRACH repetition transmission). Similar to current mechanism, a UE may wait RAR within a RAR window where a different RAR window configuration for a MTC UE (also considering CE level required) may be considered. Further, as described above, the RAR may indicate rejection of the initial access procedure due to, e.g. congestion, capability, etc.

(8) PUSCH (message 3) (S170) and ACK for message 3 (S180): The message 3 may include UE capabilities such as power reduction (class), bandwidth (BW) reduction, etc. Based on the information carried over message 3, the network may determine whether it can support the MTC UE or not, which may be signaled via ACK-NACK for message 3. Transmitting UE capabilities may be limited to only initial access. For PDCCH order based PRACH or other PRACH for SR, the message 3 may not contain UE capabilities. PUSCH resource may be configured by RAR via resource allocation. (E)PHICH resource may be determined by a hopping pattern used for cell broadcast data. In other words, unless otherwise indicated, a UE may search (E)PHICH in cell common.

However, to use this approach, (E)PHICH may need to carry for the entire system bandwidth as FDM on UL subbands is possible. Thus, it may be assumed that cell broadcast frequency may transmit (E)PHICH for message 3. Once a UE-dedicated subband is configured via RAR or via RRC after RACH procedure, a UE may expect (E) PHICH from that dedicated subbands afterwards. In other words, ACK-NACK for message 3 may be transmitted via cell broadcast region (or cell-common frequency subband), whereas other ACK-NACKs for other ULs may be transmitted via UE-dedicated subband (if configured). It is assumed that cell-common data may be searched in those frequencies only. In that case, a set of subframes for cell-specific search space (CSS) and UE-specific search space (USS) (or cell broadcast and unicast) may be preconfigured or higher layer configured such that a UE may read one or the other in a subframe. Alternatively, a UE may be higher layer indicated to read cell-common subband to update, e.g. SIB, or read other broadcast messages.

If a UE supports multimedia broadcast multicast services (MBMS), it may be supported over 6 PRBs which will be configured properly by MBMS configuration (and thus may need a new SIB to transmit MBMS related configuration/information). If a UE needs to read PSS/SSS or PBCH, a UE may make autonomous gap. A UE may skip reading a first few OFDM symbols before PSS/SSS and/or PBCH to create frequency tuning delay. Alternatively, a UE may be predetermined with a set of subframes where CSS needs to be read.

Handling of frequency retuning delay according to an embodiment of the present invention is described. In case of half-duplex FDD or TDD, switching frequency or subband may require a gap to allow frequency retuning as well as UL/DL or DL/UL switching time. To minimize the gap, frequency switching may occur only in case of UL/DL or DL/UL switching. To support it, a set of subframes may be preconfigured as gap, which may not be used for DL or UL transmissions. This may be needed only when a UE may use different subband for DL and UL. If the DL and UL is the same subcarrier, the frequency retuning latency may not be necessary. So, to maximize the resource utilization from a UE perspective, it is desirable to use the same subband at least within a radio frame or within a set of predetermined period. The subband may be switched to different subband, then it may be used until the subband is changed again. If subband for USS and CSS (or unicast and cell broadcast) is different, a UE may have to jump between subband for CSS and USS. Since it may depend on the UE condition to read which subframes read for CSS, a UE may create autonomous gap by not listening on DL or not transmitting UL whenever needed. Different from half-duplex FDD, autonomous gap may be created either for DL or UL.

Different UE capabilities and network flexibility according to an embodiment of the present invention is described. So far, it has been implicitly assumed that a MTC UE supports limited bandwidth. However, depending on its capabilities and application demands, there may be MTC UEs which may support wideband system bandwidth, yet, may have limited UL power, etc. Thus, to handle such MTC UEs, a UE may access the wideband system by reading PBCH/SIBs (designed to support legacy UEs), and then, report its capabilities. However, for example, due to the limited UL power, PRACH transmission from the UE may not be successful. In this case, some alternatives may be proposed as follows.

(1) Since such a UE associates with a cell supporting CE, this may assume that a UE is normal UE or category 0 UE where only UL CE is needed. Uplink coverage related PRACH configuration or information may be assumed to be transmitted via legacy SIB.

(2) Since such a UE associates with a cell either supporting CE or low cost, this may require that a UE should assume that the network, if support low cost, supports CE. In this case, to read necessary system information, the UE may find MTC-PBCH/MTC-SIB. If the network does not support reduced power, the UE may not be able to connect to the network.

(3) Such a UE may search either one (one by assuming normal or category 0 UE with CE or MTC UE (e.g. category X) with CE.

(4) Regardless of the access mechanism, if the network knows that a UE supports wideband, the information may be used for scheduling. In terms of UE capability, the following options may be considered.

A UE supports only low bandwidth both from RF and baseband perspective

A UE supports low bandwidth only from baseband perspective (while RF can support wide-band)

A UE supports wideband for baseband and RF

In case of second or third, the network may be able to schedule a UE via wideband PDCCH. In this case, a UE may not be required to implement MTC-PDCCH.

However, this may need to be known to the network before transmitting RAR. In general, if the UE does not require RF bandwidth reduction, it may be treated same as Rel-12 category 0 UEs. If a UE can access Rel-12 category 0 supporting network, it may also signal category 0 (if a new UE category is defined for a MTC UE in Rel-13) for fallback operation.

If MTC-PDCCH is introduced to support a MTC UE (which may support only limited bandwidth), it is desirable to also reduce the size of MTC-PDCCH. Given a low size of packet for a MTC UE in general, it is worthwhile to consider multiplex MTC-PDCCH and MTC-PDSCH in a PRB. One example is to assign one PRB (or a few PRBs) for MTC-PDCCH and the remaining REs not used for scheduling DCI for a PDSCH or UL grant may be used for PDSCH. Since it may cause the reliability issue, e.g. UL grant, a UE may not be able to detect UL grant and then rate matching is corrupted. To avoid such a case, a network may indicate two fields "DL scheduling presence" "UL scheduling presence" in a predetermined set of REs which indicates that there is DL scheduling (and PDSCH) and UL grant in the subframe. Depending on it, a UE may attempt to perform rate matching within a PRB.

Further, the UE may transmit a signal for at least one of the following capabilities.

DL bandwidth reduction (if enabled, support only 1.4 MHz or lower)

UL bandwidth reduction (if enabled, support only 1.4 MHz or lower)

UL maximum transmission power (UE power class)

Transmission mode (TM) reduction (which TMs are supported other than already optional TMs such as TM10)

Coverage enhancements

Power reduction techniques (such as long discontinuous reception (DRX), power saving mode, etc.)

When a UE supports support on wideband reception and thus it may be associated to a network supporting category 0 UEs, it may signal the fallback UE category of category 0. If there is no new UE category defined to support new cost saving features, it is desirable to differentiate the same category based on release. For example, if a UE support category 0 with features up to Rel-12, it may signal Rel-12-Cat-0 and if the UE supports category 0 capabilities with features up to Rel-13, it may signal Rel-13-Cat-0. When a UE supports both category 0, it may signal both Rel-12-Cat-0 and Rel-13-Cat-0. Even if a new UE category is defined with UE complexity reduction capabilities including potentially lower peak data rate, the UE supporting category 0 may signal Cat-0 as a fallback to previous release network. In case of connection with mobility management entity (MME), the UE may signal its Rel-13 category as well as Rel-12 category in case that MME may not be able to support Rel-13 network if it supports Rel-12-Cat-0. The meaning of supporting category 0 may imply at least one of the followings.

Be able to read wideband signals such as PDCCH

Be able to access 1.4 MHz system bandwidth (support PDCCH-based control channel and the associated SIB transmission, etc., as in legacy system)

Transmission power reduction may not be used, or the reduced power is marginal such as 3 dB Peak data rate up to category 0 capability CE may not be needed (this may not be so relevant in terms of signaling aspects)

Furthermore, if a UE supports CE, at least one of the following features may be mandated.

Handling of new SIB (if it is a capability)

Subband switching (dynamic frequency switching among subDLBW and/or subULBW)

Cross-subframe scheduling

EPDCCH

PDCCH-less PDSCH reception

Relaxed UE measurement/feedbacks

From the network perspective, if all these are supported, there may be different UE types as follows.

TM reduction only

BW reduction only

BW reduction+TX power reduction only

BW reduction+CE (where the CE requirement level is less than 15 dB from both DL and UL perspective)

BW reduction+TX power reduction+CE (where the CE requirement level is less than 15 dB from the UL perspective)

BW reduction+TX power reduction+CE (where the CE requirement level is less than 15 dB from the DL perspective, and higher from UL perspective)

The network may have the flexibility to support any mode or any type shown above. Furthermore, in terms of the CE level, further flexibility to support less than 15 dB from either DL or UL may be considered. The network may signal its capability among those (potentially with CE level it supports—DL and UL separate signaling may also be feasible) in SIB such that a UE can determine the network capability. When each mode is supported, the followings may be required to be supported from the network for each mode in terms of initial access.

(1) Category 0 support: SIB-1 may indicate whether the network supports category 0 UE. Unless other things are configured, a UE may assume that the network at least support category 0. For this, Rel-13 network which supports a low cost may support category 0 specified in Rel-12. Other features may be treated as capability.

(2) BW reduction only: Since a UE needs to inform the network about reduced BW, it is desirable to use different PRACH resource. Thus, separate PRACH configuration or dedicated preambles may be used for MTC UEs. This may be indicated by the network via PBCH (additional field) or new PBCH or via the detection of a new SIB which is designed to support reduced bandwidth UEs.

(3) BW reduction+TX power reduction only: Since TX power reduction UE may require certain repetition of the PRACH, it may require the signaling from the network that the network supports repeated PRACH transmissions. If a UE does not require PRACH repetition even with reduced power, it may behave as option 2 (BW reduction only). If a UE needs PRACH repetition, since the UE needs to inform the necessity of CE and the PRACH repetition, the network may configure a separate PRACH configuration or resource from a BW reduction only UEs. This may be indicated by the network via PBCH (additional field indicating support of UL CE) or new PBCH or via the detection of a new SIB, which is designed to support reduced bandwidth UEs and also includes additional PRACH configuration to support PRACH repetition (which may be separate configuration or dedicated preambles). This UE may be associated with the network which supports option 4 (5 or 6) if the CE is needed and the network may not support option 2 but support option 4 (or 5 or 6).

(4) BW reduction+CE (where the CE requirement level is less than 15 dB from both DL and UL perspective): Since this UE requires repetition for both DL and UL, the network may need to indicate the capability of the network to allow repetition in both directions along with CE level. For this, separate PRACH (maybe separate from option 3) may be needed in terms of PRACH configuration or preambles. This may be indicated by the network via PBCH (additional field indicating support of UL/DL CE) or new PBCH or via the detection of a new SIB, which is designed to support reduced bandwidth UEs and also includes additional PRACH configuration to support PRACH repetition (which may be separate configuration or dedicated preambles). This UE may be associated with the network which supports option 5 (or 6) if the CE is needed and the network may not support option 4 but support option 5 (or 6).

(5) BW reduction+TX power reduction+CE (where the CE requirement level is less than 15 dB from the UL perspective): It is similar to option 4.

(6) BW reduction+TX power reduction+CE (where the CE requirement level is less than 15 dB from the DL perspective, and higher from UL perspective): It is similar to option 4. Between options 5 and 6, the maximum CE level supported by the network for DL and UL (or separate) may be transmitted via SIB or RAR or other higher layer signaling.

(7) CE only+category 0: If a category 0 UE needs CE, it may require indication from the network which supports CE for category 0. In addition to signal of supportability on category 0, it may also need indication of supportability on CE and potentially along with the maximum CE level that the network supports. Additional configuration to enable CE such as the source for PRACH repetitions may be signaled.

(8) CE only: For a normal UE (other than category 0 or MTC UEs), the network may support CE only. In this case, SIB may carry the supportability of CE as well as the necessary configuration for CE operation. For a normal UE, a UE may signal the capability of supporting coverage enhancement.

For each option for each case, a UE may signal a set of capabilities/modes that the UE supports via higher layer signaling.

Handling of low control signal and data, and accordingly, change of RB granularity according to an embodiment of the present invention is described. In general, the size of control signal and data for a MTC UE is very small. Thus, current frame structure and/or RB allocation seems too much for a MTC UE. Thus, smaller granularity of RB allocation may be considered. One example is to allocate 0.5 PRB (from legacy UE perspective) as a MTC-PRB. Thus, in 1.4 MHz system bandwidth, for a MTC UE, there may be totally 12 MTC-PRBs instead of 6 MTC-PRBs. The scheduling granularity for a MTC-UE which requires reduced bandwidth may be based on 6 subcarriers and 14 (or less than 14) OFDM symbols. Further, PRB granularity reduction in time domain may also be considered. For example, scheduling may be separate for the first slot and second slot.

In general, lower granularity for PRB mapping for a MTC UE may be considered. This may be used for EPDCCH set configurations, PDCCH mapping, and data scheduling. The same principle may be applied for UL scheduling as well. If this is used, enhanced resource element group (EREG) mapping may need to be changed. Also, transport block (TB) size determination may be changed where a simple rule may be applied to (TB size for a MTC UE=TB size from the current specification*0.5 (as only the half PRB is used for delivering PDSCH)) or (TB size for a MTC UE=TB size from the current specification*0.25 (if one PRB is spilt to four MTC-PRBs for a MTC UE)). The mapping of demodulation RS (DM-RS) may become a bit challenging as well channel state information RS (CSI-RS) resource mapping. Thus, for resource mapping, it may be assumed that the MTC UE follows legacy PRB mapping. For DM-RS, a MTC UE may assume that at least two split MTC-PRB are used in case DM-RS is used. Thus, MTC-PRB may be usable better with EPDCCH based on CRS rather than DM-RS.

Network assistance for handover for UEs requiring CE according to an embodiment of the present invention is described. For a UE requiring CE, it is expected that all channels including PBCH may be repeated to support CE. To minimize spectral efficiency degradation, cell broadcast channels such as PBCH may be likely to be repeated intermittently rather than continuously. When a UE boots-up, since the information is not available from any cell, a UE may have to blindly search intermittently retransmitted/repeated PBCHs for a cell. However, once a UE is associated with a cell or camp on a cell, the network assistance to inform the rough location of intermittent PBCH transmission may be considered. Not only PBCH but also other necessary information required to support UEs requiring CE, such as SIB, may be transmitted with intermittent PBCH transmission. For example, if the network transmits repeated PBCH once every 1 hour where intermittent SIB transmissions may occur as well, initially, for a UE to search a cell by reading PBCH, it may take up to 1 hour as the UE does not know when the intermittent transmission would occur.

However, if a cell is associated or camp on any cell, it may acquire the rough timing information, and then, the cell may transmit timing information of neighbor cells where intermittent PBCH/SIB (and potentially other information as well) transmission may occur to support UEs requiring CE. This may be signaled by SIB of the camp-on or associated or serving cell. In other words, the rough information of time (potentially frequency location as well) location of intermittent transmission of necessary system information and MIB of a neighbor cell (both inter and intra-frequency cells may be considered for this assistance) may be indicated via one cell. Even though a cell may not support CE, it may still transmit the information of neighbor cells which support CE. Alternatively, it may be assumed that rough timing of intermittent transmission of system information among neighbor cells is aligned. If a UE detects intermittent transmission from one cell, it may be able to assume that neighbor cells also transmit intermittent repetitions as well. In this case, indication from the serving cell on timing for intermittent transmission may be sufficient.

More specifically, the timing information may include offset and interval where offset may be determined based on SFN of the cell which transmits assistance information (e.g. camp-on cell or serving cell) and it may indicate the starting (rough timing) timing of intermittent transmission. Interval is the period between two intermittent repetitions.

Also, this information at least signaled at hand-over from one cell to another cell may assist the quick acquisition of system information.

Since the network maximum CE level may not be sufficient for a UE depending on its location and the required coverage level from a cell, it is also desirable to indicate the maximum CE level that neighbor cells support via assistance information. For example, a list of cells which supports MTC UE may be signaled along with the maximum CE level that the cell supports. If the cell does not support CE, maximum CE level may be set as 0 dB. In terms of measurement reports, a UE may determine the list of cells which the UE may be associated with, and then report to only those cells. For example, if signal to interference noise ratio (SINR) is −16 dB from a cell (and thus, CE of at least 10 dB is needed from the cell) and the cell supports only 2 dB enhancement, the UE may not report measurement result of the cell to the serving cell, as it may not be feasible to be handed over to that cell. Another approach is to transmit measurement results where the threshold may be lowered considering potential CE gain and the network may determine the target cell for hand-over. In terms of maximum CE level, the network may also set a RSRP threshold which the network can support. If a UE cannot acquire RSRP higher than the threshold, the UE may assume that the cell is barred for the access.

To configure the assisted information, those information need to be exchanged via backhaul signaling among cells.

RACH procedure according to an embodiment of the present invention is described. When a UE transmits PRACH, it may select a resource which is uniquely assigned to each CE level. To differentiate between a MTC UE with UL power reduction and a MTC UE without UL power reduction, and also a MTC UE with a normal UE supporting CE, some resource separate may be necessary. There may be possibly three different types of UEs as follows.

(1) Type 1: A MTC UE (reduced bandwidth) with reduced UL power (2) Type 2: A MTC UE (reduced bandwidth) without reduced UL power (3) Type 3: A normal UE (not reduced bandwidth) without reduced UL power In terms of RAR reception, type 1 and type UE may not be needed to be differentiated. The capability of bandwidth may be signaled via message 3 for type 3, different from type 1. In terms of differentiation between type 1 and type 2, which defines possibly different number of repetitions, the following alternatives may be considered.

Repetition number may be defined per type 1 where type 2/3 are allowed to be transmitted with only reduced number of repetitions. For example, for CE level 5 dB, repetition number for PRACH may be determined as 20 times where type 2/3 may transmit with less number of repetition such as 10. In this case, the network may be supposed to perform blind decoding.

Type 1 and type 2/3 may be differentiated based on preamble where type 2/3 may take smaller number of repetitions or take the same number of repetitions Different resource for type 1 and type 2/3 may be defined. For another approach to handle multiplexing between different maximum UL power, it may be restricted that a normal UE without UL power reduction may also use the lower power assuming UL power reduction if multiplexing is allowed. In other words, until a normal UE is attached to the network, it may behave as a MTC with UL power reduction. This may be achieved via setting PEMax as the UL power reduction such that a normal UE cannot use its configured maximum power. Another approach is to simply restrict the normal UE from utilizing the configured maximum power.

Differentiation between type 2 and 3 may be further considered where type 2/3 may be differentiated via different preamble or resources in terms of time/frequency.

Once the network receives PRACH repetition, it may determine the repetition level required for RAR. In terms of RAR repetition number, there may two approaches as follows.

(1) A UE may assume a constant repetition number which is determined based on PRACH CE level. For example, if PRACH uses 5 dB CE level, RAR may also be transmitted using 5 dB CE level.

(2) A UE cannot assume a constant repetition number. In this case, a UE may need to blindly search the repetition numbers of RAR.

Regardless of which approach is used, resource pool where RAR is transmitted may be defined at least before USS narrow-band is configured as follows.

(1) A set of separate resource pool may be defined per CE level: Either different narrow-band and/or time may be defined for different CE level. In this case, if the second approach described above (repetition number is not fixed) is assumed, a UE may need to blindly search the number of repetitions. Another approach is to restrict the blind search candidates of repetition levels such that repetition number=K is defined for the CE level that PRACH has used, then a UE needs to blindly search K/2 and 2*K. The network may always transmit to 2*K repetition level where the UE reports the successful decoding repetition number in message 3 such that the network can know the required repetition number for DL transmission. Furthermore, the repetition number for message 3 may determine according to PRACH (coarse granularity) or according to RAR. RAR may indicate the required number of repetitions for message 3.

(2) A common resource pool may be used where the RAR is differentiated by repetition number of RAR where repetition number corresponds to the PRACH CE level.

(3) A set of separate narrow-band may be defined per CE level where CE level is determined by PRACH repetition level. The occasion of RAR in each narrow-band may be further determined by M-PDCCH or narrow-band occasion configured either implicitly (derived from PRACH configuration) or explicitly.

(4) M-PDCCH may indicate the narrow-band where RAR PDSCH is scheduled. M-PDCCH for this purpose may be scheduled via dedicated CSS narrow-band.

Once a UE is configured with C-RNTI and configured with USS narrow-band, RAR may be transmitted from USS narrow-band instead of above mechanism.

For the case of normal coverage, resource pool of RAR may be determined as follows.

M-PDCCH may indicate the narrow-band where RAR PDSCH is scheduled.

A dedicated narrow-band may be configured either by SIB or predefined, where RAR occasion is configured or implicitly determined based on PRACH configuration.

Center 6 PRBs may always be used for RAR transmission where RAR occasion may be determined based on RAR occasion configuration or based on PRACH configuration.

Multiple CSS narrow-bands (NBs) may be configured.

Different CSS NB may be monitored per purpose (e.g. different NB between paging and RAR).

Same NB may be used for CSS and USS when a UE is connected.

RAR windows size according to an embodiment of the present invention is described. If RAR is multiplexed in a narrow-band, the maximum RAR window size may be defined as (maximum repetition number of RAR*maximum number of preamble). Starting subframe of RAR may be defined per ending subframe of PRACH transmission or starting subframe of PRACH. For example, starting RAR subframe may be (starting subframe+K'+3), where K' is the number of PRACH repetition number configured for a CE level. A UE may transmit less number of repetition than K' if a UE does not have UL power reduction or some other reasons. In general, RAR window size may be defined as (maximum number of repetition number of RAR*maximum number of preamble) used in a narrow-band where the UE expects to receive RAR. If a separate RAR narrow-band is defined per CE level, where maximum number of repetition of RAR is different per CE level, different RAR window size may be used. Within a RAR window, the possible starting subframe may be defined as one of the following approaches.

(1) Per each maximum number of repetition: For example, if the same narrow-band is shared among different CE levels or the UE is required to perform blind decoding on all CE levels, possible starting subframe within a RAR window may be defined as (S+L*M), where S is the starting subframe index of RAR window and L=0, ?, I, and M is the maximum number of repetition number.

(2) If a UE is required to perform only one repetition number for RAR, (S+L*M') may be starting subframes where M' is the number of repetition that the UE expects.

PRACH resource according to an embodiment of the present invention is described. Currently, frequency location of PRACH may be determined by $n_{PRBoffset}^{RA}$ which defines the offset from the first PRB where the first PRB of PRACH resource can reside. Now that, it is considered that a set of narrow-bands may be used in both DL and UL. Thus, the location of PRACH transmission needs to be aligned with UL narrow-bands. Thus, the offset may be used rather 6 PRBs unit than a PRB unit. For example, $n_{NBoffset}^{RA}$ may be 0, 1, . . . where the PRACH narrow-band is determined as narrow band 0 or narrow band 1, and so on. In terms of frequency location of PRACH, it may be determined as Equation 1 described below.

$$n_{NB}^{RA} = \begin{cases} n_{NB\ offset}^{RA} + \left\lfloor \frac{f_{RA}}{2} \right\rfloor, & \text{if } f_{RA} \bmod 2 = 0 \\ N_{NB}^{UL} - n_{NB\ offset}^{RA} - \left\lfloor \frac{f_{RA}}{2} \right\rfloor, & \text{otherwise} \end{cases} \quad \text{<Equation 1>}$$

In other words, frequency location of PRACHs may be defined per narrow-band in edge of system bandwidth excluding one or more narrow-bands in the edge (which are used for legacy PUCCH or other transmissions). If different frequency location is configured per CE level, different $f_{RA}$ value may be assigned per each CE level. When hopping is used, $f_{RA}=0$ may hop to the location of $f_{RA}=5$ (and vice versa), and $f_{RA}=1$ may hop to f=4 (and vice versa). Or, offset may be used where f hops to $\{(f_{RA}+\text{offset})$ % total number of narrow-bands used for PRACH$\}$.

Figure 7:
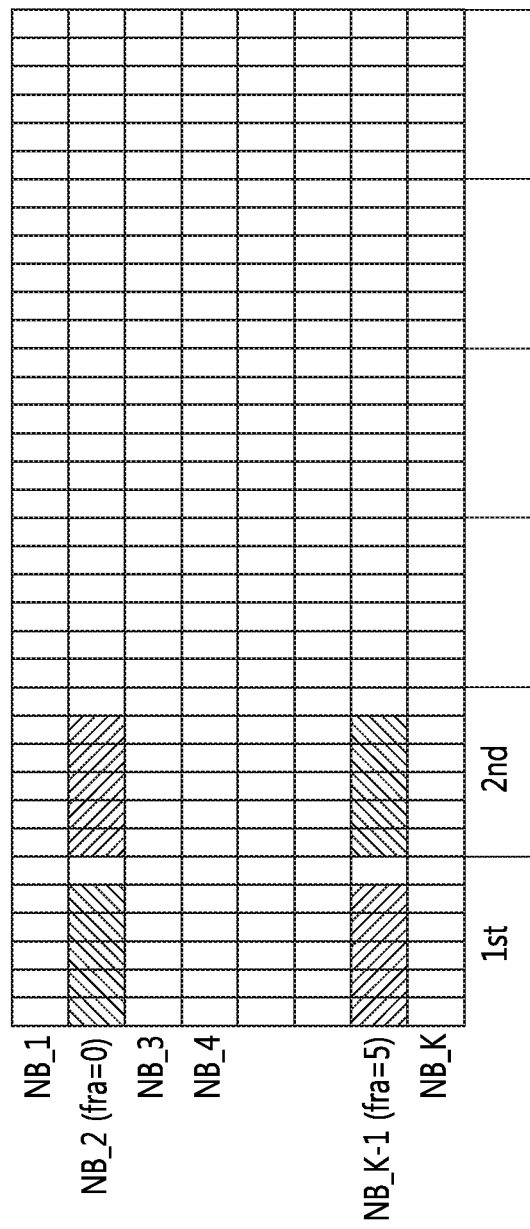
FIG. 7 shows an example of frequency location of PRACHs according to an embodiment of the present invention.

FIG. 7 shows an example of frequency location of PRACHs according to an embodiment of the present invention. FIG. 7 shows a case that $n_{NBoffset}^{RA}=1$ with hopping pattern of mirroring. Referring to FIG. 7, NB_2, corresponding to $f_{RA}=0$, hops to NB_K−1, corresponding to $f_{RA}=5$.

It is generally desirable to transmit PRACHs in consecutive subframes assuming that PRACH resource is available in every subframe. However, due to possible collision with legacy PRACH, sounding reference signal (SRS), TDD, etc., it is desirable to configure a set of UL subframes usable for PRACH transmission. One approach is to use legacy PRACH configuration which defines the available set of subframes usable for PRACH where only starting subframe set is configured (a separate configuration is feasible per CE level). However, this approach may reduce the gain from multi-subframe channel estimation and also frequency hopping. Thus, another approach is to create a PRACH resource configuration rather based on a unit of multiple subframes where consecutive subframes may be used for PRACH transmission. For example, instead of using density within 10 ms, density per 100 ms (or some other value) may be used. For example, Table 1 shows an example of a frame structure type 1 (i.e. FDD) random access configuration for preamble formats 0 according to an embodiment of the present invention.

TABLE 1

| PRACH Configuration Index | Preamble Format | System frame number | Subframe number |
|---|---|---|---|
| 0 | 0 | Even | 0, 1, 2, 3, 4 |
| 1 | 0 | Even | 5, 6, 8, 9, 9 |
| 2 | 0 | Even | [0-9] |
| 3 | 0 | SFN %5 = 0 | 0, 1, 2, 3, 4 |
| 4 | 0 | SFN %5 = 0 | 5, 6, 8, 9, 9 |
| 5 | 0 | SFN %5 = 0 | [0-9] |
| 6 | 0 | Any | 0, 1, 2, 3 |

Similar to TDD, PRACH resource may be defined as a function of density (in a resource unit), where ($f_{RA}$, $f_{RA}^{(0)}$, $f_{RA}^{(1)}$, $f_{RA}^{(2)}$) may be used to indicate PRACH resource. $f_{RA}$ may represent the narrow-band location (logical where physical location may change per hopping pattern which is a cell-common pattern). $f_{RA}^{(0)}$ may represent all radio frames, first K radio frame, second K radio frame where K is predefined (e.g. K=5). In other words, instead of PRACH configuration length is fixed to 20 ms, it may be extended to, e.g. 100 ms. Furthermore, different configuration set may be used per each CE level, where PRACH occasion may occur more often in low CE level compared to high CE level. To change it, K may be configurable or fixed per CE level. For example, in LC, K=1, in low CE level, K=2, and in high CE level, K=5. $f_{RA}^{(1)}$ may represent first half of subframes in each radio frame or second half subframes in each radio frame configured by $f_{RA}^{(0)}$. $f_{RA}^{(2)}$ may define a set of starting subframe which may be defined a multiple of repetition number, and thus, different value may be configured per CE level.

Table 2 and Table 3 show an example of a frame structure type 2 (i.e. TDD) random access configuration for preamble formats 0 according to an embodiment of the present invention.

TABLE 2

| PRACH configuration Index | Preamble Format | Density Per K*10 ms $D_{RA}$ | Version $r_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |

TABLE 3

| PRACH configuration Index | CE level 0 | CE level 1 | CE level 2 | CE level 3 |
|---|---|---|---|---|
| 0 | (0, 1, 0, 2) | (1, 1, 0, 1) | (2, 1, 0, 0) | (3, 1, 0, 2) |
| 1 | (0, 2, 0, 2) | (1, 2, 0, 1) | (2, 2, 0, 0) | (3, 2, 0, 2) |
| 2 | (0, 1, 1, 2) | (0, 2, 1, 1) | (1, 1, 1, 0) | (1, 2, 0, 1) |
| 3 | (0, 1, 0, 2) | (0, 2, 0, 1) | (2, 1, 0, 0) | (3, 2, 0, 2) |

Referring to Table 2 and Table 3, PRACH configuration index (0, 1) may be used for FDM among CE levels, and PRACH configuration index (2, 3) may be used for FDM/TDM among CE levels. In other words, PRACH configurations for FDM/TDM may be configured among CE levels.

Figure 8:
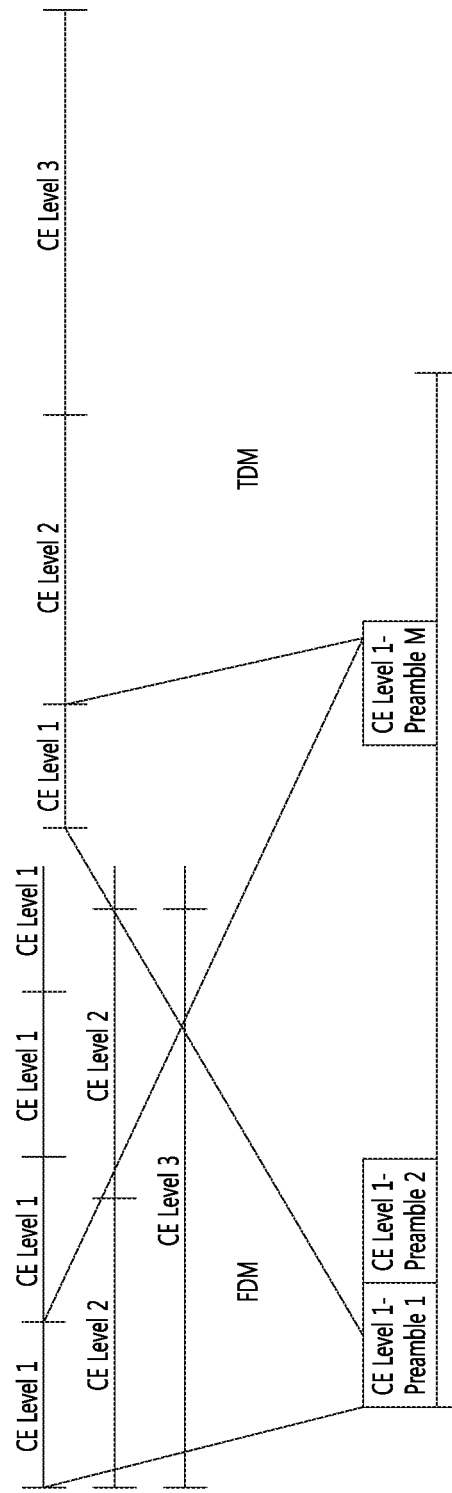
FIG. 8 shows an example of PRACH configurations for FDM/TDM among CE levels according to an embodiment of the present invention.

FIG. 8 shows an example of PRACH configurations for FDM/TDM among CE levels according to an embodiment of the present invention. Referring to FIG. 8, PRACH configuration for FDM/TDM is configured per each CE level, e.g. CE level 1.

RA-RANI according to an embodiment of the present invention is described. Currently, RA-RNTI is defined by Equation 2.

$$\text{RA-RNTI} = 1 + t\_id + 10 * f\_id \qquad \text{<Equation 2>}$$

In Equation 2, t_id is the index of the first subframe of the specified PRACH (0≤t_id<10), and f_id is the index of the specified PRACH within that subframe, in ascending order of frequency domain (0≤f_id<6). The MAC entity may stop monitoring for RAR(s) after successful reception of a RAR containing random access preamble identifiers that matches the transmitted random access preamble. However, considering that different repetition number may be used between MTC UEs with or without UL power reduction, instead of utilizing the first subframe, it may use the end subframe. Or, depending on its type, t_id (a UE with UL power reduction) or t_id*2 (for a UE without UL power reduction) may be used. In other words, RA-RNTI may be differentiated for different UE type. Furthermore, CE level that the UE used for PRACH transmission may also be considered. In this case, RA-RNTI may be defined by Equation 3.

$$\text{RA-RNTI} = 1 + t\_id + 10 * f\_id + \text{CE\_level} \qquad \text{<Equation 3>}$$

In Equation 3, t_id is the index of the end subframe of the specified PRACH. In other words, CE level and/or end subframe and/or different number of repetitions used for PRACH transmission may need to be accounted for RA-RNTI. Also, considering that RAR may not be multiplexed, RA-RNTI may be different per preamble. Otherwise, a UE may not stop monitoring RAR until it detects its corresponding RAR which matches to the preamble index that the UE has transmitted.

RAR message transmission according to an embodiment of the present invention is described. Assuming that RA-window has been extended, RAR may be transmitted per UE in a control channel format. In this case, backoff may not be used to make the size of RAR as same. RAR may be transmitted in a control channel. If RAR is transmitted in a control channel format, it is desirable to have the same size between RAR and other control channel. Also, if control channel format is used for paging, it is further desirable to have the same size between RAR and paging.

FIG. 9 shows an example of a current RAR. Referring to FIG. 9, currently RAR includes R field, timing advance command field, UL grant field and temporary C-RNTI field. However, UE ID used in paging has only 16 bits. To align the size between two formats, it may be assumed that that UE IDs are repeated three times.

Another approach is to use the same size between paging and other scheduling transmitted via non-UE-specific search space where RAR may use different size. Since it is necessary only for initial PRACH procedure or UE-initiated procedure (PDCCH-order initiated procedure may utilize only control information to carry the necessary information where RAR may be omitted, however, timing advance (TA(may be necessary and UL grant may also be necessary), different handling between two may be further considered. In general, UL grant may be fixed in initial procedure and temporary C-RNTI may be missed in PDCCH-order initiated procedure. In other words, UL grant may be preconfigured, or selected according to either PRACH or RAR such that content of RAR may be reduced to be fit in the size of control channel. One simple approach is to fix the narrow-band location of message 3 to reduce the resource allocation field where the narrow-band used for PRACH transmission may be used for message 3. However, PRACH subframes configured for potential PRACH transmission in that narrow-band may not be used for message 3 transmission. Another approach is to configure or prefix narrow-band or a set of narrow-bands which may be used for message 3. Since message 3 may be transmitted over 1 PRB, instead of configuring multiple narrow-bands, one narrow-band may be configured for message where PRB is selected by narrow-band index of PRACH transmission where (narrow-band index % 6) is used for PRB index of message 3.

If a network configures starting subframe sets for a set of repetition levels including maximum CE level that the network supports, RAR starting subframe may utilize those starting subframe sets where the repetition number and/or candidates of repetition number(s) may be derived from PRACH CE level. For example, when SIB indicates that the starting subframe of control channel is every 100 ms, the UE may expect to receive RAR at the first starting subframe after the last transmission of RAR transmission+3 ms.

Figure 10:
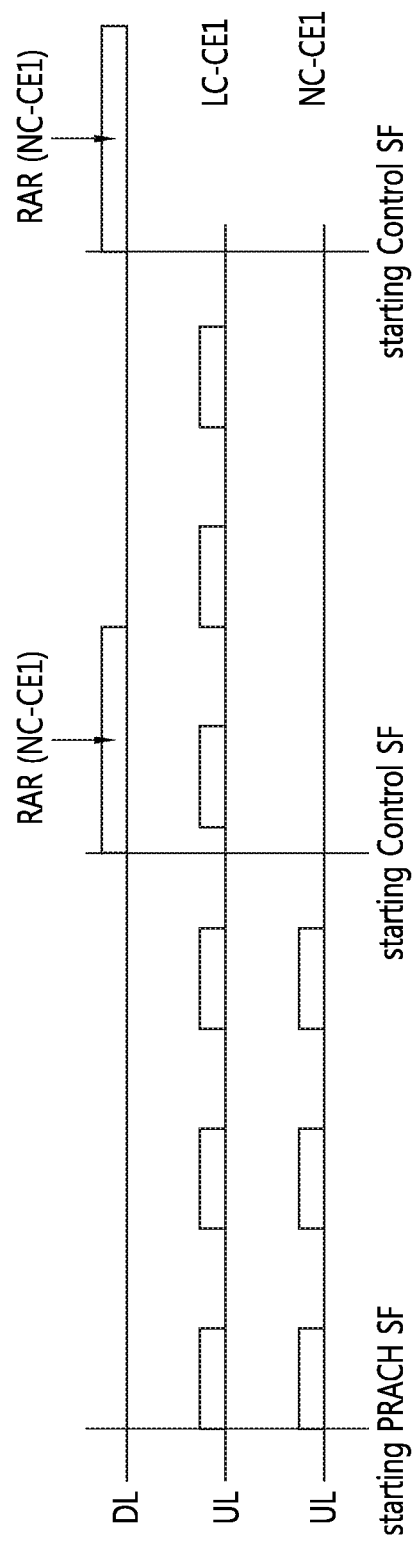
FIG. 10 shows an example a timing diagram according to an embodiment of the present invention.

FIG. 10 shows an example a timing diagram according to an embodiment of the present invention. Referring to FIG. 10, starting PRACH subframes are configured, and from the starting PRACH subframe, RAR starting subframes may be configured based on PRACH CE level.

Regarding message 3 transmission, similar to PRACH, the UE with and without UL power reduction may take different repetition level. Since the network may be able to differentiate between two UE types, message 3 repetition level may be confirmed by the network via RAR.

Message 4 reception according to an embodiment of the present invention is described. Message 4 may be transmitted in the same narrow-band where RAR has been transmitted. Alternatively, message 4 may be transmitted in a different narrow-band which is defined by temporary C-RNTI. The repetition level of message 4 may be defined by the repetition level of RAR. Alternatively, message 4 repetition level may be blindly searched via searching multiple possible repetition levels. If a UE cannot identify narrow-band for temporary C-RNTI, the same narrow-band where RAR has been transmitted may be used. However, it may be good if the narrow-band may be scheduled via RAR such that the UE can use the narrow-band for message 4 reception. Nonetheless, a UE may use the default narrow-band which is defined by temporary C-RNTI until it is configured to use a different narrow-band for control channel monitoring. In the default narrow-band, the cell-common configured starting subframe sets may be monitored for control channel reception.

Figure 11:
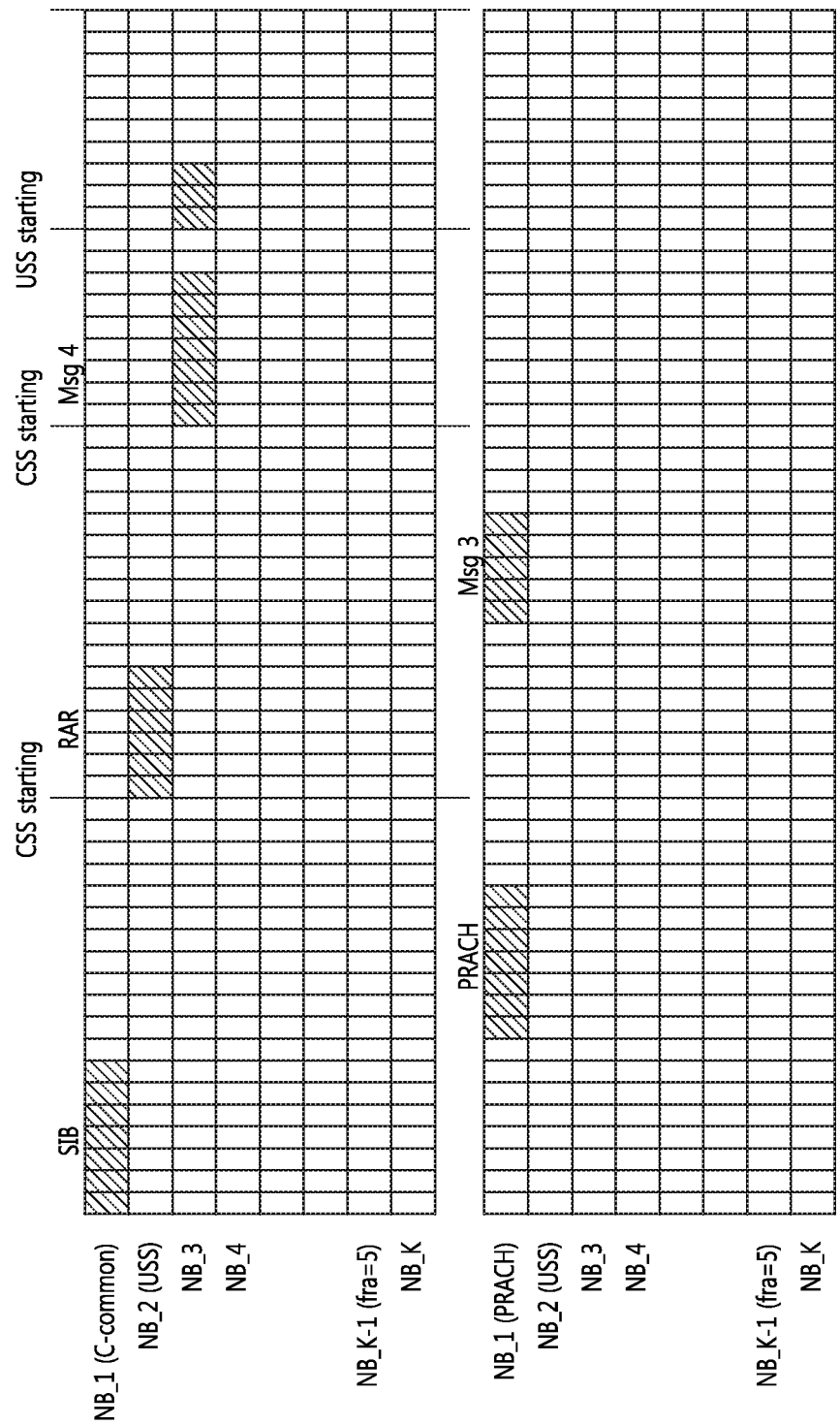
FIG. 11 shows an example of timing and narrow-band for transmission/reception for an initial access procedure according to an embodiment of the present invention.

FIG. 11 shows an example of timing and narrow-band for transmission/reception for an initial access procedure according to an embodiment of the present invention. Referring to FIG. 11, SIB is transmitted in NB_1, which is cell-common, and PRACH is transmitted in NB_1. Further, RAR is transmitted in NB_2, which is at USS, and message 3 is transmitted in NB_1. Finally, Message 4 is transmitted in NB_3, which is configured as default USS.

In summary, this present invention proposes the followings:

Message 4/RAR may be transmitted or may start in a different set of subframe from a set of starting subframes for control channel scheduling data with C-RNTI and/or the repetition level configured to a UE for control channel repetition. More specifically, the UE may monitor more repetition levels for message 4 and RAR or monitor multiple repetition level(s) derived from PRACH repetition level.

The narrow-band used for RAR may be either fixed or associated with PRACH transmission. The narrow-band used for message may be either fixed or associated with temporary C-RNTI.

To allow transmission of RAR and paging in a control channel, size of RAR and paging may be aligned with a scheduling DCI with possible zero padding.

PRACH resource may be determined per narrow-band level rather than PRB level.

Repetition number used by a UE without UL power reduction may be smaller than by a UE with power reduction using the same CE level. In other words, CE level may be defined by DL coverage. To differentiate between two UE types, separate preamble may be used. Alternatively, separate resource may be configured for each UE type.

Further, for a UE to be able to receive and transmit DL and UL channels, at least one of the following configuration parameters may need to be configured to a UE either implicitly or explicitly.

(1) Cell-Common Configurations

Narrow-band configuration and frequency hopping patterns

PRACH resource(s) & PRACH configuration

RAR resource(s) & RAR configuration (if any)

Paging resource(s) & paging occasion configuration

Message 4 resources

ACK/NACK resource for message 4

CSS configuration (if any) including a set of starting subframes

Power settings (such as P0_PUCCH)

The set of subframes which may be used for MTC UEs (e.g., excluding MBSFN subframes)

Maximum CE level supported by the network (2) UE-Specific Configurations

1) M-PDCCH Related Configuration

Common to normal coverage and enhanced coverage: Narrow-band index (virtual or physical) where M-PDCCH may be monitored, PRB set where M-PDCCH may be mapped (default value may be considered for CE), M-PDCCH set (if multiple sets may be configured), Localized or distributed (if both options are configurable)

For enhanced coverage: Repetition level or CE level and its associated blind decoding candidates, starting subframe set 2) PUCCH Related Configuration Resource Mapping Related Parameters Coexistence of non-UE-specific SS and USS in the same narrow-band according to an embodiment of the present invention is described. As mentioned above, there may be a narrow-band where CSS is monitored for cell common data transmission. This may be particularly useful in case of normal coverage without repetition. Once a UE is configured with a narrow-band for USS, if the UE has to monitor different narrow-band for CSS, it may require a type of TDM between USS and CSS, which may be inefficient due to frequency retuning, and also TDM separation. Thus, it is desirable to consider monitoring CSS or non-UE-specific SS in the same narrow-band where a UE monitors USS. In case of normal coverage, coexistence of two SSs may be easily achievable by configuring one EPDCCH set for CSS and the other EPDCCH set for USS. For CSS, aggregations levels may be restricted and different hashing function may be used. In case of CE, coexistence between two SS may have different blind decoding candidates which may also have different repetition levels. For example, if reconfiguration is used to reconfigure CE level of M-PDCCH transmission, or if paging is transmitted with non-fixed repetition level for non-UE-specific SS, a UE may need to assume maximum repetition numbers or more candidates of repetition numbers whereas the UE may need to monitor a limited number of repetition numbers for USS (e.g. one configured repetition level). To minimize blind decoding overhead, TDM between non-UE-specific SS and USS may be further considered in CE.

Figure 12:
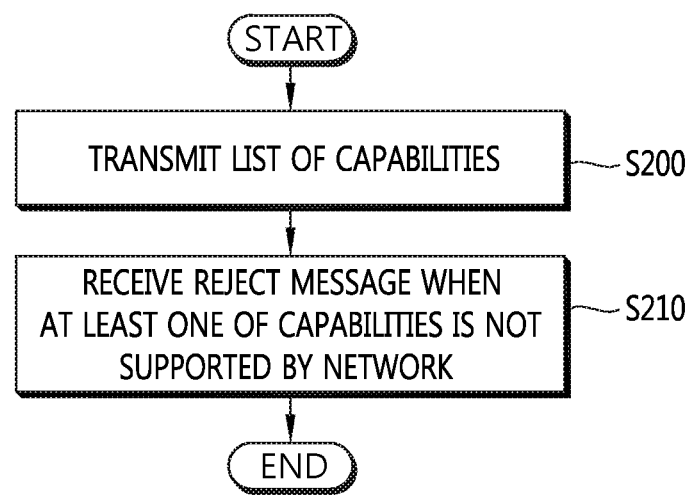
FIG. 12 shows an example of a method for performing an initial access procedure according to an embodiment of the present invention.

FIG. 12 shows an example of a method for performing an initial access procedure according to an embodiment of the present invention.

In step S200, the MTC UE transmits a list of capabilities to a network. The list of capabilities may be transmitted via a random access preamble on a PRACH or a message 3 on a PUSCH. The list of capabilities may include at least one of a power reduction, a bandwidth reduction, or coverage enhancement. The MTC UE may support the bandwidth reduction and the coverage enhancement.

In step S210, the MTC UE receives a reject message from the network when at least one of the capabilities is not supported by the network. The reject message may be received via a random access response or an acknowledge message for the message 3. A specific field in the random access response may be set to a pre-determined value for the reject message. A specific resource for the acknowledge message may be reserved for the reject message.

Further, the MTC UE may receive a set of capabilities from the network via a MIB or a SIB. The set of capabilities may be represented as a bitmap in which each bit indicates whether a specific capability is supported or not by the network. Further, the MTC UE may receive a SIB for the MTC UE from the network before transmitting the list of capabilities. A location of the SIB may be changed based on a pre-determined hopping pattern. The pre-determined hopping pattern may be a subframe index based cell-common hopping or a radio frame index based cell-common hopping. The system information for the MTC UE may be received in a pre-determined subframe. The system information for the MTC UE may include at least one of a location of a dedicated subband or a PRACH configuration.

Signaling of usable downlink subframe for MTC UEs according to an embodiment of the present invention. Due to cell common data transmission, MBSFN, etc., there are subframes usable for DL repetition restricted. In other words, full subframes may not be usable for DL transmission for MTC UEs, even though a UE can read all subframes to acquire CRS. If CRS/DM-RS boosting may be used, a UE may not be expected to read other subframes than configured DL subframes for MTC UEs. One example is to configure MBSFN subframe like configuration where the indicated bits are assumed to be usable by a MTC UE (or reversely assume those are not available). In this case, it may be assumed that non-MBSFN subframes are usable by MTC UEs. Another example is to configure a bitmap of size 10 (per radio frame) to indicate which subframes are usable for MTC UEs. If MBSFN subframe like configuration is used, restriction of UL subframes may not be easily doable. Another approach is to preconfigure a set of subframes, and SIB may indicate the configuration used by the network. For example, similar to PRACH resource, Table 4 shows the pre-configuration of a set of subframes.

TABLE 4

| Available subframe configuration Index | System frame number | Subframe number |
| --- | --- | --- |
| 0 | Even | [0, 1, 2, 3, 4] |
| 1 | Even | [5-9] |
| 2 | Even | [0-9] |
| 3 | Even | [0, 1, 4, 5, 9] |
| 4 | Any | [0, 1, 2, 3, 4] |
| 5 | Any | [5-9] |
| 6 | Any | [0-9] |
| 7 | Any | [0, 1, 4, 5, 9] |

Even though this may restrict the flexibility of MBMS configuration, it may signal both DL and UL. This may be configured in addition to MBSFN subframe like configuration where a UE assume that only inter-sected subframes are usable for DL reception (for UL, this indication may be used in conjunction with DL/UL configuration).

When this is configured and message 3 is transmitted to the subband where PRACH is transmitted, the UE may skip subframes configured for potential PRACH transmission from the repetition. Also, when this is configured, the number of subframes in a radio frame may increase only based on this value.

Figure 13:
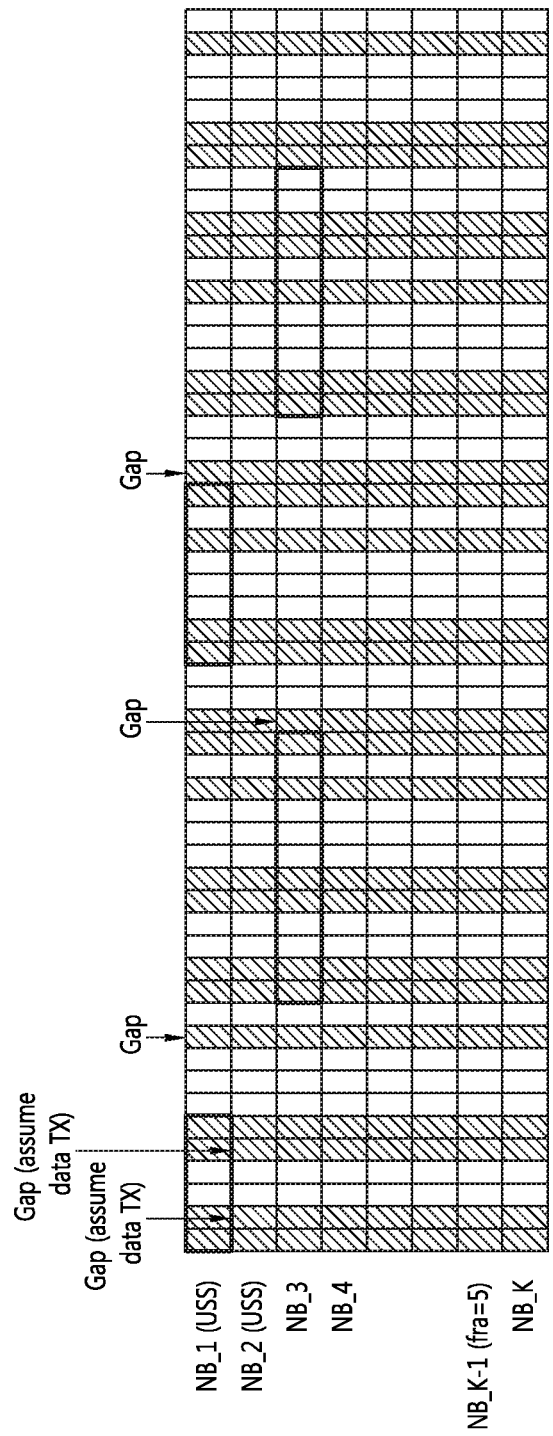
FIG. 13 shows an example of cross-subframe scheduling and other timing in FDD according to an embodiment of the present invention.

FIG. 13 shows an example of cross-subframe scheduling and other timing in FDD according to an embodiment of the present invention. FIG. 13 assumes that available subframe configuration index 7 described above is used. Referring to FIG. 13, when control channel transmission ends at subframe n, data transmission may occur at subframe n+k, where k is the next available DL subframe counting 1 valid DL subframe. For UL, similar to DL, only valid UL subframes are counted for the timing. In case of TDD, if all UL subframes are available, TDD PUSCH timing may be reused. Furthermore, a UE may be required to estimate the subframe where DL reception may occur and required to change the narrow-band location before it needs to read data channel Thus, in case that a UE is scheduled in NB_2, the second transmission of control channel may be received as the UE is required to switch its frequency before data reception. In other words, the gap may always be created right before actual transmission/reception, and in that way, the network may schedule/utilize more narrow-band subframes. Furthermore, when more than one control channel is transmitted consecutively, the UE may assume that narrow-band for data reception is also in the same narrow-band so that frequency retuning between two data reception is not required. Otherwise, the UE may ignore the second or latter scheduling.

Figure 14:
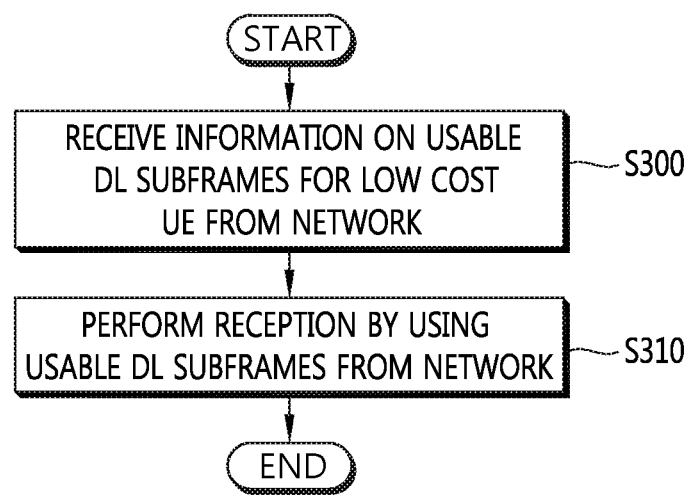
FIG. 14 shows an example of a method for signaling usable DL subframes for a low cost UE according to an embodiment of the present invention.

FIG. 14 shows an example of a method for signaling usable DL subframes for a low cost UE according to an embodiment of the present invention.

In step S300, the low cost UE receives information on usable DL subframes for the low cost UE from a network. The information on the usable DL subframes may include a subframe configuration where indicated bits corresponds to the usable DL subframes. The usable DL subframes may be non-MBSFN subframes. Or, the information on the usable DL subframes may include a bitmap which has a size of 10. Or, the information on the usable DL subframes may include a pre-configuration of the usable DL subframes. The information on the usable DL subframes may be received via SIB. A number of subframes in a radio frame may increase according to the pre-configuration of the usable DL subframes.

In step S310, the low cost UE performs reception by using the usable DL subframe from the network. The performing reception comprises receiving a control channel at a first usable DL subframe, and receiving a data channel at a second usable DL subframe, which is a next usable DL subframe of the first usable DL subframe. The next usable DL subframe may count one valid usable DL subframe.

Figure 15:
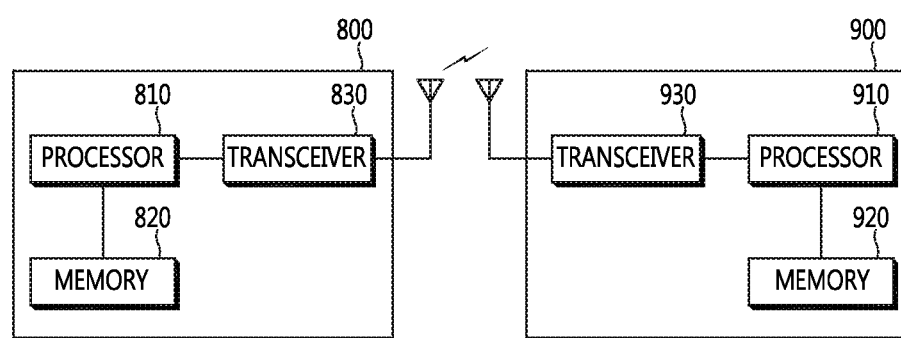
FIG. 15 shows a wireless communication system to implement an embodiment of the present invention.

FIG. 15 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A MTC UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
    measuring a reference signal received power (RSRP) based on at least one reference signal received by the wireless device;
    determining an uplink coverage enhancement level based on the measured RSRP and a difference between a first maximum power and a second maximum power, wherein the first maximum power is a maximum power of the wireless device, and the second maximum power is a maximum power other than the first maximum power;
    determining a physical random access channel (PRACH) resource related to the uplink coverage enhancement level; and
    transmitting a PRACH preamble based on the PRACH resource to a network.

2. The method of claim 1, further comprising:
    determining a number of repetitions for transmission the PRACH preamble based on the uplink coverage enhancement level.

3. The method of claim 1, wherein the difference between the first maximum power and the second maximum power is 15 dB.

4. The method of claim 1, wherein a resource for the PRACH preamble is separately configured from a resource for a PRACH preamble for one or more other wireless devices.

5. The method of claim 1, wherein the wireless device performs communications based on a bandwidth of 6 resource blocks (RBs).

6. The method of claim 1, wherein the second maximum power is a maximum power of one or more other wireless devices.

7. A wireless device in a wireless communication system comprising:
    a memory;
    a transceiver; and
    at least one processor, operatively coupled to the memory and the transceiver,
    wherein the at least one processor is configured to:
    measure a reference signal received power (RSRP) based on at least one reference signal received by the wireless device,
    determine an uplink coverage enhancement level based on the measured RSRP and a difference between a first maximum power and a second maximum power, wherein the first maximum power is a maximum power of the wireless device, and the second maximum power is a maximum power other than the first maximum power,
    determine a physical random access channel (PRACH) resource related to the uplink coverage enhancement level, and
    control the transceiver to transmit a PRACH preamble based on the PRACH resource to a network.

8. The wireless device of claim 7, further comprising:
    determining a number of repetitions for transmission the PRACH preamble based on the uplink coverage enhancement level.

9. The wireless device of claim 7, wherein the difference between the first maximum power and the second maximum power is 15 dB.

10. The wireless device of claim 7, wherein a resource for the PRACH preamble is separately configured from a resource for a PRACH preamble for one or more other wireless devices.

11. The wireless device of claim 7, wherein the wireless device performs communications based on a bandwidth of 6 resource blocks (RBs).

12. The wireless device of claim 7, wherein the second maximum power is a maximum power of one or more other wireless devices.

* * * * *